(12) United States Patent
Li et al.

(10) Patent No.: US 12,394,997 B2
(45) Date of Patent: Aug. 19, 2025

(54) HIGH-VOLTAGE BATTERY DISCONNECT METHOD AND MOTOR VEHICLE USING THE SAME

(71) Applicant: GM GLOBAL TECHNOLOGY OPERATIONS LLC, Detroit, MI (US)

(72) Inventors: Shifang Li, Shelby Township, MI (US); Seungwoo Paik, Wixom, MI (US); Li-Pen John Ho, Farmington Hills, MI (US); Andrew K. Chandler, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 585 days.

(21) Appl. No.: 17/887,011

(22) Filed: Aug. 12, 2022

(65) Prior Publication Data
US 2024/0055876 A1 Feb. 15, 2024

(51) Int. Cl.
*H02J 7/00* (2006.01)
*H01M 10/42* (2006.01)

(52) U.S. Cl.
CPC ......... *H02J 7/0031* (2013.01); *H01M 10/425* (2013.01); *H02J 7/00309* (2020.01); *H01M 2010/4271* (2013.01)

(58) Field of Classification Search
USPC .......................................... 320/137
See application file for complete search history.

(56) References Cited

U.S. PATENT DOCUMENTS

| | | | |
|---|---|---|---|
| 11,124,076 B1* | 9/2021 | Borghi | B62D 21/02 |
| 2022/0311257 A1* | 9/2022 | Lai | H01M 50/583 |

* cited by examiner

*Primary Examiner* — Bryce M Aisaka
(74) *Attorney, Agent, or Firm* — Quinn IP Law (57) ABSTRACT

A method is provided for controlling a vehicle battery system that includes a voltage bus having positive and negative bus rails, at least one battery pack connected to the voltage bus and having positive and negative battery terminals, and a battery disconnect unit. The method includes disconnecting the at least one battery pack from the voltage bus via the battery disconnect unit by performing a first battery disconnect process upon detecting an event condition, by performing a second battery disconnect process upon detecting a high overcurrent condition, and by performing a third battery disconnect process upon detecting a low overcurrent condition. The first battery disconnect process utilizes opening a main pyro fuse, the second battery disconnect process utilizes one or more of thermal fuses, solid-state relays and/or current sensors, and the third battery disconnect process utilizes one or more contactors or solid-state relays.

20 Claims, 6 Drawing Sheets

HIGH-VOLTAGE BATTERY DISCONNECT METHOD AND MOTOR VEHICLE USING THE SAME

INTRODUCTION

The present disclosure relates to high-voltage (HV) battery electric systems having a rechargeable electrochemical battery pack and one or more HV components connected thereto. When the battery electric system is utilized as part of an electrified powertrain, e.g., of a battery electric vehicle (BEV), plug-in hybrid electric vehicle (HEV), or other mobile system, the battery pack is an integral component of a rechargeable energy storage system (RESS). The RESS in turn is connected to one or more electric propulsion motors. When the electric propulsion motors are configured as polyphase/alternating current (AC) motors, the HV components arranged in corresponding HV circuit legs or channels may include a corresponding power inverter, referred to in the art and disclosed herein as a power inverter module (PIM). Other HV components powered by the RESS may include accessory power modules (APMs) in the form of direct current (DC)-to-DC voltage converters, onboard charging modules (OBCMs), air conditioning compressor modules (ACCMs), low voltage (LV) and other modules, which are connected to the RESS and its battery pack(s) across opposing voltage bus rails of a DC voltage bus.

The present disclosure relates to an HV battery system, such as a type utilized to power propulsion functions aboard a BEV, HEV, or other mobile platform, as well as to an electric powertrain having such a battery system as part of an onboard DC power supply. More specifically, the present disclosure is related to disconnecting the battery of a BEV, an HEV, or other mobile system from various high voltage (HV) loads in order to achieve voltage disconnect requirements of various conditions/modes/events.

Pure BEVs, HEVs, and other mobile systems having an electrified powertrain may include one or more fast-acting pyrotechnic switches, such as pyro fuses, which instantly open in an irreversible manner in response to an electronic triggering signal. A mobile system of such a vehicle or system may include sensors configured to output the electronic triggering signal, typically as a current or voltage signal in response to detection of conditions indicative of failure modes indicated by threshold, measured accelerations, decelerations, and/or g-forces. Strategic positioning of one or more pyrotechnic switches within the circuitry of the propulsion battery pack is intended to help ensure that the battery pack quickly disconnects from the HV bus in response to events exceeding predefined acceleration/deceleration limits.

SUMMARY

Present electrical systems of motor vehicles having an electrified powertrain may partially meet HV disconnect requirements by utilizing thermal fuses for each HV circuit, a single main thermal fuse for all circuits from the battery, and pyro fuses, and opening contactors with current sensor monitoring instead of utilizing pyro fuses. The various solutions provided herein are intended to improve the quality and performance of such HV disconnect hardware and related control systems as described in detail below.

The present disclosure utilizes a categorization of different HV disconnect requirements for various HV loads to provide an improved approach that limits the number of higher cost as well as quality and performance issues of pyro fuses and contactors and reduces the frequency of HV load disconnections that result in Loss of Power (LoP). Specifically, the present disclosure is related to utilizing a combination of high-voltage disconnect devices and controls for different high voltage circuits as well as a current sensor-based monitoring system to trigger disconnect of the battery in order to better meet disconnect requirements upon different failure conditions with improved quality and performance as well as cost reduction.

Specifically, the present invention provides a method, system and motor vehicle for controlling a battery electric system of a motor vehicle, the battery electric system including a direct current (DC) voltage bus having a positive bus rail and a negative bus rail, at least one battery pack connected to the DC voltage bus and having a positive battery terminal and a negative battery terminal, and a battery disconnect unit (BDU). The method disconnects the at least one battery pack from the DC voltage bus by performing, via the BDU, a first battery disconnect process upon detecting an event condition, the first battery disconnect process utilizing a pyro fuse, disconnects the at least one battery pack from the DC voltage bus by performing, via the BDU, a second battery disconnect process upon detecting a high overcurrent condition, the second battery disconnect process utilizing one or more thermal fuses, solid-state relays (SSRs) and current sensors, and disconnects the at least one battery pack from the DC voltage bus by performing, via the BDU, a third battery disconnect process upon detecting a low overcurrent condition, the third battery disconnect process utilizing one or more contactors or one or more SSRs.

The first battery disconnect process opens the main pyro fuse to disconnect the at least one battery pack. The second battery disconnect process determines a high overcurrent on an accessory load and utilizes at least the one or more thermal fuses, SSRs, or current sensors to disconnect the at least one battery pack, or determines that an overcurrent threshold or overcurrent duration is exceeded and opening the main pyro fuse, or utilizes the one or more contactors or the one or more SSRs to disconnect the at least one battery pack. The third battery disconnect process utilizes the one or more contactors or the one or more SSRs to disconnect the at least one battery pack.

Opening the main pyro fuse utilizes a squib driver. Detecting the event condition includes receiving an indication from an airbag module of the motor vehicle. Detecting the high overcurrent condition includes determining overcurrent that causes a hard short circuit. Detecting the low overcurrent condition includes determining overcurrent that causes a low cell voltage of the at least one battery pack.

The event condition is related to an external vehicle event indicative of a threshold deceleration of the motor vehicle. The low overcurrent condition is related to an accessory load, a power inverter module (PIM), or a DC fast-charging (DCFC) event.

The present disclosure may be extended to modifications and alternative forms, with representative embodiments illustrated in the drawings and disclosed in detail herein. Inventive aspects of the present disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

The present disclosure may be embodied in many different forms. Representative embodiments of the present disclosure are illustrated in the drawings and disclosed herein in detail as non-limiting examples of the disclosure. Disclosure not explicitly recited in the claims, should not be incorporated into the claims, singly or collectively, by implication, inference, or otherwise.

For purposes of the present disclosure, unless specifically disclaimed, use of singular tense includes the plural tense and vice-versa, the terms "and" and "or" shall be both conjunctive and disjunctive, and the words "including," "containing," "comprising," "having," and similar terms shall mean "including without limitation." Moreover, words of approximation such as "about," "almost," "substantially," "generally," "approximately," and similar words may be used herein to mean "at, near, or nearly at," or "within 0-5% of," or "within acceptable manufacturing tolerances," or logical combinations thereof.

A component disclosed as "configured to perform or "configured for performing" a specified function is capable of performing the specified function without alteration, rather than merely having potential to perform the specified function after further modification. In other words, the disclosed hardware, when expressly "configured to perform" or "configured for performing" the specified function, is specifically selected, created, implemented, utilized, programmed, and/or designed for the purpose of performing the specified function. In the drawings, like reference numbers refer to the same or similar components.

Figures 1, 1A:
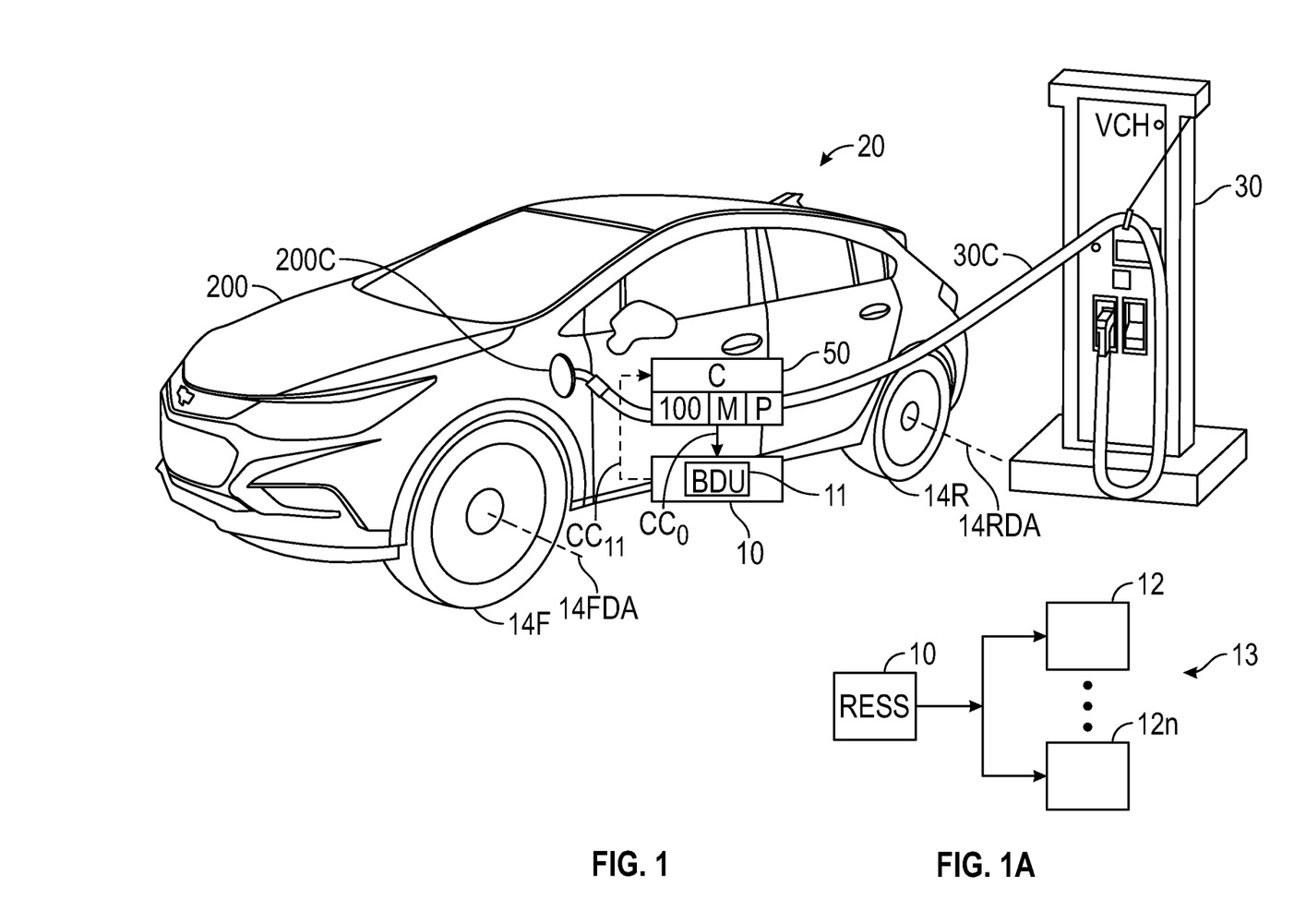
FIG. 1 illustrates a motor vehicle according to an embodiment of the present disclosure having a battery electric system equipped with a high-voltage (HV) battery pack and an emergency disconnect circuit.
FIG. 1A illustrates a battery electric system according to an embodiment of the present disclosure.

FIG. 1 illustrates a motor vehicle 20, which according to an embodiment of the present disclosure includes a battery electric system 13 equipped with a high-voltage (HV) battery pack and an emergency disconnect circuit. FIG. 1A illustrates a battery electric system according to an embodiment of the present disclosure. As illustrated in FIG. 1A, electrical power from a discharge of a rechargeable energy storage system (RES S) 10 is utilized to power a plurality of HV components (12 . . . 12n) as part of a battery electric system 13 (illustrated in FIG. 1A), where "n" is an application-specific integer. For clarity and simplicity, the plurality of HV components 12, . . . , 12n is referred to hereinafter as "HV components 12." As illustrated in FIG. 1A, the HV components 12 may include, by way of example and not of limitation, one or more power inverters, auxiliary power modules/DC-to-DC voltage converters, onboard charging modules, drive units, and similar elements. The battery electric system 13 may be utilized in the exemplary motor vehicle 20, e.g., when the motor vehicle 20 is configured as a battery electric vehicle or a plug-in hybrid electric vehicle as disclosed herein. Other rechargeable systems are envisioned within the scope of the present disclosure and, therefore, the motor vehicle 20 illustrated in FIG. 1 is just one possible implementation of the present disclosure.

Figure 2A:
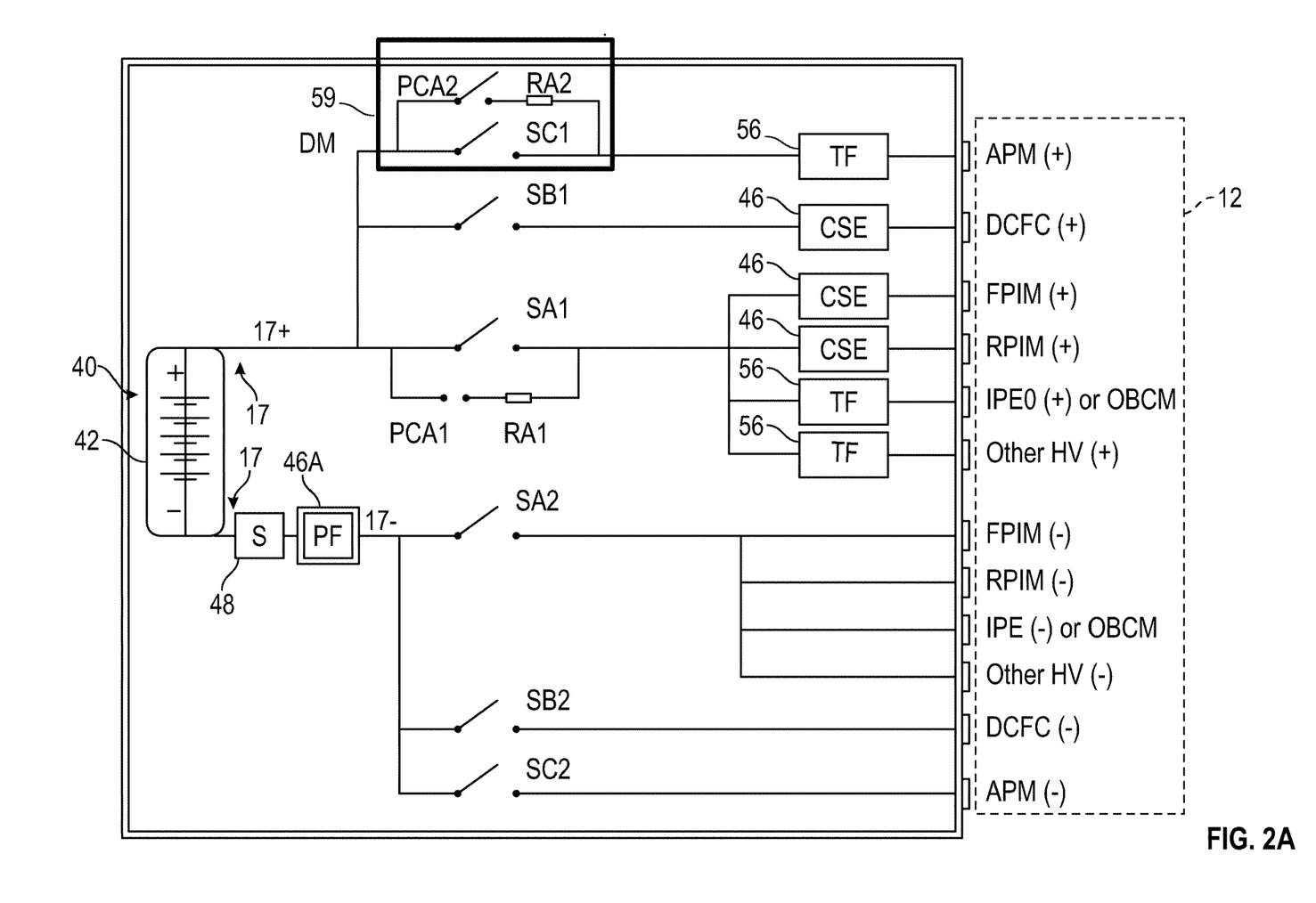
FIG. 2A illustrates a battery electric system according to an embodiment of the present disclosure.
Figure 2B:
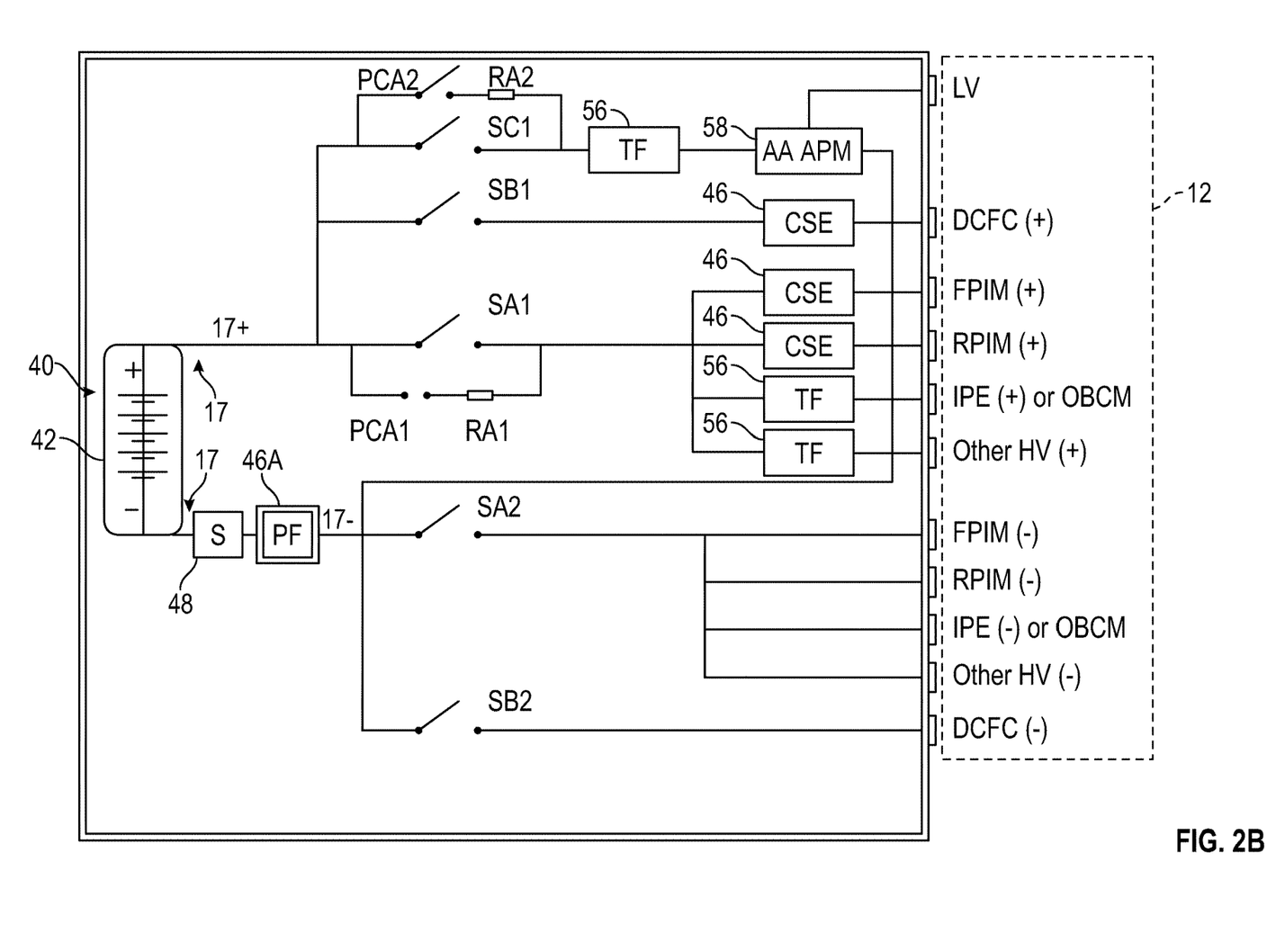
FIG. 2B illustrates a battery electric system according to an alternate embodiment of the present disclosure.

The present disclosure addresses conditions under which disconnect of the HV bus 17 or the battery pack 40 of FIG. 2A and FIG. 2B is necessary during certain predetermined fault conditions. The present disclosure provides high voltage overcurrent protection (HVOCP) by differentiating between different conditions under which disconnect of the HV bus 17 is necessary, specifically a first condition that requires immediate disconnect of the HV bus and a second and third condition which, unlike the first condition, may not require immediate disconnect of the HV bus 17.

As illustrated in FIG. 1, the present control strategy may be embodied as computer-readable instructions 100 recorded in memory (M) of a control system 50 (indicated as "C" in FIG. 1), such as one or more digital computers or electronic control units, and executed by one or more processors (P). The memory (M) includes tangible, non-transitory memory, e.g., read only memory, whether optical, magnetic, flash, or other type. The control system 50 also includes application-sufficient amounts of random-access memory, electrically-erasable programmable read only memory, and similar memory, as well as a high-speed clock, analog-to-digital and digital-to-analog circuitry, and input/output circuitry and devices, as well as appropriate signal conditioning and buffer circuitry.

The battery electric system 13 illustrated in FIG. 1 includes a battery disconnect unit (BDU) 11. The control system 50 is operable to receive input signals (arrow $CC_{11}$) from the BDU 11 indicating electric current passing between the RESS 10 and the various HV components 12. The present disclosure protects the RESS 10 and the HV components 12 from thermal damage due to short-circuit faults, as well as events. The events may be incidents related to contact with an external object detected by the control system 50 and other threshold force/acceleration/deceleration conditions and overcurrent faults. As used subsequently, the term "event" or "events" will be used to refer to such incidents, threshold force/deceleration faults and overcurrent faults for brevity. The control system 50 executes the disclosed control actions via output signals (arrow $CC_o$).

As illustrated in FIG. 1, the motor vehicle 20 includes a vehicle body 200 having a charging receptacle 200C (where is this denoted?). The vehicle body 200 is connected to front road wheels 14F and rear road wheels 14R. The front and rear road wheels 14F and 14R rotate about a corresponding front drive axis 14FDA and rear drive axis 14RDA when the RESS 10 discharges a stored electrical charge to one or more of the HV components 12 configured as, for example, a power inverter for a polyphase/alternating current electric propulsion motor. Pulse width modulation (PWM) or other switching state control is utilized to energize individual phase windings of the traction motor(s), thereby producing torque about one or both the drive axes 14FDA and/or 14RDA. The battery electric system 13 is operable to power the road wheels 14F and/or 14R in different embodiments, depending on the specific drive configuration of the motor vehicle 20 or other mobile system in this non-limiting embodiment.

In the charging state illustrated in FIG. 1, the RESS 10 is recharged by a charging voltage (VCH) from an offboard charging station 30. The charging voltage is provided to the RESS 10 by the offboard charging station 30 via a charging cable 30C, with the charging cable 30C terminating in a suitable charge connector, such as an SAE J1772 charge connector (not illustrated). When the motor vehicle 20 is connected to the offboard charging station 30, the charging voltage and a corresponding charging current is utilized to recharge each electrochemical battery cell 42 of the RESS 10 as illustrated in FIG. 2A and FIG. 2B.

The offboard charging station 30 illustrated in FIG. 1 may be configured as a DC fast-charging (DCFC) station in some instances, such that the charging voltage is nominally 300-volts to 400-volts or more. The RESS 10 in some embodiments may be selectively transitioned to a specific configuration to accommodate a lower or higher level of the charging voltage, or the RESS 10 could use a single battery pack 40 as shown in FIG. 2A and FIG. 2B.

FIG. 2A illustrates the battery electric system 13 according to an embodiment of the present disclosure. FIG. 2B illustrates a battery electric system according to an alternate embodiment of the present disclosure.

As illustrated in FIG. 2A, the battery electric system 13 includes a battery pack in which individual current sensing elements (CSE) 46 are connected in series with a corresponding number of high-voltage (HV) components. Specifically, the battery electric system 13 includes a rechargeable energy storage system (RESS) 10 in which individual CSE 46 are connected in series with a corresponding number of HV components 12. The RESS 10 includes one or more battery packs or battery modules 40 each having positive (+) and negative (−) battery terminals. A plurality of electrochemical battery cells 42 of each battery pack 40 may be constructed of a lithium-ion, zinc-air, nickel-metal hydride, or another application-suitable high-energy battery chemistry.

As further illustrated in FIG. 2A, The RESS 10 is configured to supply a battery voltage across positive and negative bus rails 17+ and 17− of a HV bus 17. Additionally, the RESS 10 includes a shunt S 48, which is a type of CSE such as a Hall effect, in series with a main pyrotechnic fuse PF 46A ("main pyro fuse"). The shunt S 48 measures total battery pack 40 current and the main pyro fuse (PF) 46A irreversibly fails in an open position in response to a corresponding current signal or current/voltage signal (CCA* or CCB*) (see FIG. 3) to rapidly disconnect each battery pack 40 in response to a detected fault. Each CSE 46 measures current for individual loads, such as front power inverter modules (FPIM), DCFC, and rear power inverter modules (RPIM).

The RESS 10 illustrated in FIG. 2A is connectable to the offboard charging station 30 illustrated in FIG. 1 to perform a DCFC operation via the charging receptacle 200C. In an exemplary circuit topology, the positive battery terminal of the battery pack 40 is connected to the positive bus rail 17+ by contactors PCA (in series resistor RA), SA1, SB1, and SC1. Contactor PCA1 a pre-charge contactor and a resistor RA1 is a pre-charge resistor. It is noted that the combination of PCA2/RA2, SC1 and SB1 may be referred to as a disconnect module 59 and may be replaced by SSRs or a manual switch.

Similar to the contactor SA1 at the positive bus rail 17+, the RESS 10 also includes main negative contactors SA2, SB2 and SC2 to connect the negative battery terminal of the battery pack 40 to the negative bus rail 17−. Therefore, the battery pack 40 may be disconnected by operation of the control system 50 illustrated in FIG. 1 by opening the main negative contactors SA2, SB2 and SC2, and/or by opening the contactors SA1, SB1 and SC1. As illustrated in FIG. 2A, this process occurs in response to a detected overcurrent fault.

Other elements of the battery electric system 13 of FIG. 2A disclosed subsequently include the previously disclosed CSE 46, which may be utilized with a shunt S 48 and pyrotechnic switch or pyro fuse PF 46A. The CSE 46 and thermal fuses (TF) 56, which can be replaced by solid-state relays, are set forth in detail subsequently with reference to FIGS. 3-5.

The alternate embodiment of FIG. 2B is similar to the embodiment of FIG. 2A. However, unlike the embodiment of FIG. 2A, the embodiment of FIG. 2B is applied to LV by utilizing a TF 56 in series with an Always Available Accessory Power Module (AA APM) 58 and an LV for both the positive bus rail 17+ and negative bus rail 17−.

Figure 3:
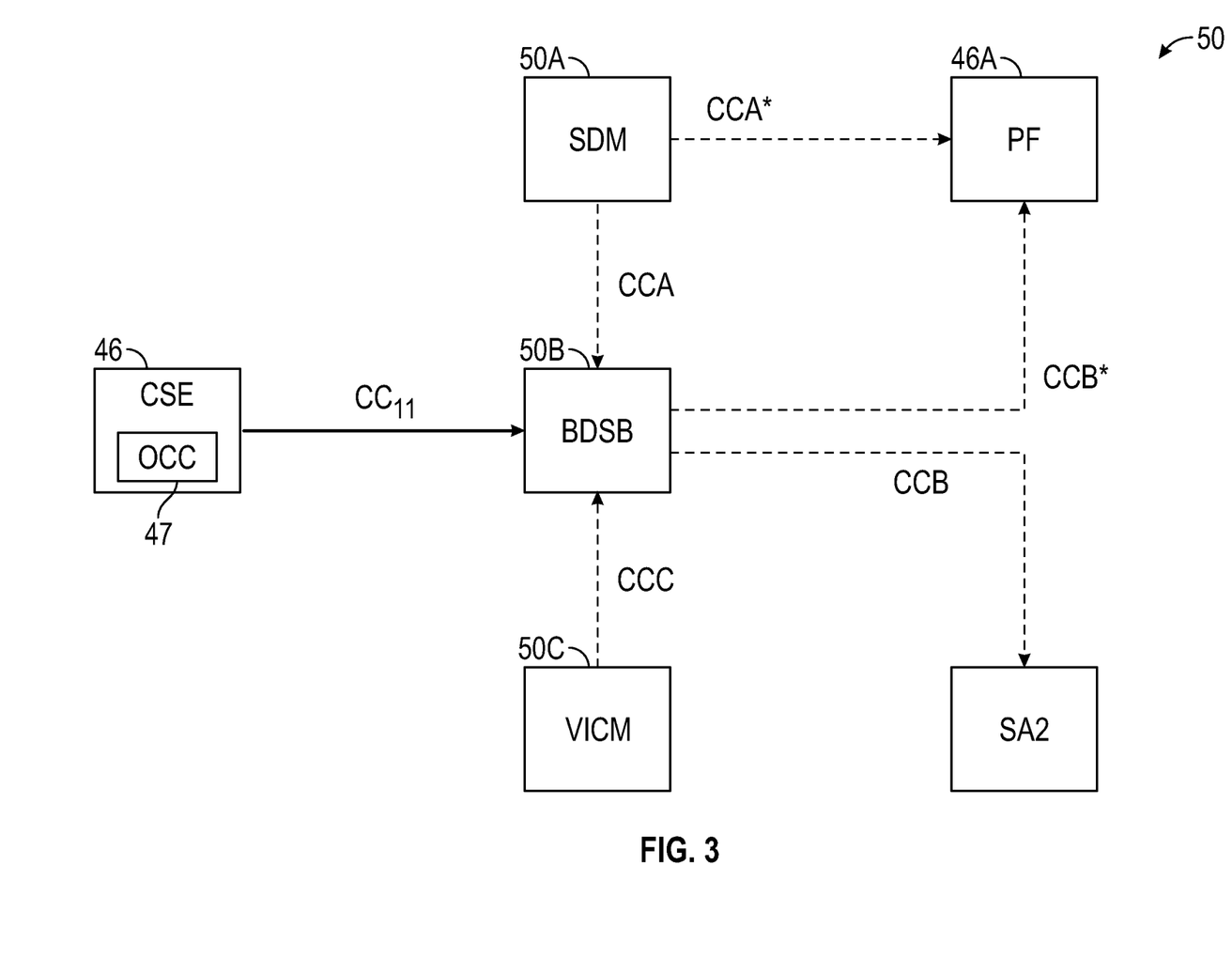
FIG. 3 illustrates a control system according to an embodiment of the present disclosure for use with the battery electric system illustrated in FIGS. 2A and 2B.

FIG. 3 illustrates the control system 50 of FIG. 1 according to an embodiment of the present disclosure for use with the battery electric system 13 illustrated in FIG. 1A. As illustrated in FIG. 3, the control system 50 may include multiple sub-controllers or electronic control units each having a dedicated set of disconnect functions, specifically a Sensor and Diagnostic Module (SDM) 50A, a Battery Disconnect Sensing Board (BDSB) 50B, and a Vehicle Integration Control Module (VICM) 50C.

The SDM 50A detects threshold forces/decelerations indicative of an event. In response to a threshold force/deceleration fault detected by the SDM 50A, for example by utilizing accelerometers or force sensors, the SDM 50A outputs the signal CCA or CCA*, with CCA* provided to the PF 46A and CCA provided to the BDSB 50B in different embodiments. Receipt of CCA* causes the PF 46A to immediately open via a thermodynamic pyrotechnic response, thereby creating an immediate and irreversible disconnection of the battery pack 40 from the HV bus 17.

The VICM 50C signal controls the contactor operations. The BDSB 50B senses voltages, currents, and isolation on the HV bus. The BDSB 50B opens the HV bus during a fast-acting short circuit event via the short S 48. The VICM 50C opens the HV bus during a slow overcurrent event via the CSE 46 or a Hall effect sensor. The VICM 50C may be located on an electronic circuit board that controls the open/closed states of the various contactors illustrated in FIGS. 2A and 2B, such as PCA, SA1, SA2, SB1, SB2, SC1 and SC2. The CSE 46 illustrated in FIGS. 2A and 2B provide the input signals (arrow $CC_{11}$) to the BDSB 50B in various embodiments as part of a designated short-circuit fault-based disconnect function. The VICM 50C is another embedded controller of the motor vehicle 20 illustrated in FIG. 1, which is programmed to perform the specific functions disclosed herein as well as others in the overall operation of the control system 50. The VICM 50C outputs a control signal (arrow CCC) to the BDSB 50B in response to a detected overcurrent fault as part of its programmed overcurrent protection function.

The present disclosure utilizes circuit-triggered control of the PF 46A and the BDU 11 to protect the RESS 10 under three different conditions: (1) a short-circuit fault, (2) a force/deceleration-based fault, and (3) an overcurrent fault. For overcurrent fault protection, the embodiment of FIGS. 2A and 2B may rely on the VICM 50C illustrated in FIG. 3 informing the BDSB 50B of the overcurrent condition, via the control signal CCC illustrated in FIGS. 2A and 2B.

The VICM 50C informs the BDSB 50B of the overcurrent condition, via the control signal CCC, with the VICM 50C responding by opening the main negative contactor SA2 or SB2 to disconnect the battery pack 40 from the negative bus rail 17. The BDSB 50B notifies the VICM 50C of the current versus time values. The VICM 50C determines an overcurrent event and notifies the BDSB 50B to open contactors. If VICM 50C determines overcurrent has occurred, VICM 50C opens the contactors. The other two fault handling strategies of the present disclosure, specifically short-circuit and force/deceleration-based disconnection of the RESS 10, utilize various hardware and electronic signals to attain the desired disconnections.

As illustrated in FIGS. 2A, 2B and 3, the SDM 50A responds to a detected threshold force/deceleration indicative of an event by transmitting the CCA signal to the BDSB 50B, which in turn causes the PF 46A to irreversibly open. In an exemplary embodiment, an ADBMS2950 chip, commercially available from Analog Devices, Inc. of Wilmington, NC, fast-acting short circuit at 16 kHz utilizing an overcurrent comparator (OCC) 47 illustrated in FIG. 3. The BDSB 50B provides the CCB* signal to the PF 46A, thereby opening the PF 46A in less than 2 ms, or provides the CCB signal to SA2. Given the present limited commercial availability of a dual-input pyro fuse, the CCA signal from the SDM 50A is routed through the BDSB 50B in this embodiment.

Short-circuit fault handling in the embodiment illustrated in FIG. 2A and FIG. 2B is achieved utilizing CSE 46 and fuses for the various HV components 12 illustrated in FIG. 1 as well as a shunt S 48, which is a current sensor used for short circuit detection and may be located on the HV+ or, preferably, on the HV− as illustrated in FIGS. 2A and 2B. The CSE 46 may be a hall effect sensor.

The three approaches implemented, as illustrated in FIGS. 2A and 2B, utilize the BDU 11 to achieve EV high voltage disconnect requirements of various conditions/modes/events. The failure conditions/modes are categorized and addressed with different circuit disconnect devices and controls to reduce cost, improve HV protection performance, improve hardware quality and reduce loss of propulsion incidents. A combination of high voltage disconnect devices (pyro fuse, thermal fuse, e-fuse, contactors) and controls for different HV circuits to meet disconnect requirements upon different failure conditions provides improved performance and cost reduction. A current sensor-based monitoring system is utilized to trigger a single pyro fuse disconnect of a propulsion drive unit (PDU) and a DCFC module during certain fault conditions.

A first approach is illustrated in FIG. 2A for some HV components 12. A second approach is illustrated in FIG. 2B for other HV components 12. A third approach is illustrated in FIG. 2B for a failure mode such as an event.

The first approach illustrated in FIG. 2A utilizes a CSE 46 and/or short S 48, possibly including the OCC 47 illustrated in FIG. 3, for detecting an overcurrent fault, with the CSE 46 provided between the positive voltage rail 17+ and each of the RPIM, FPIM, and a positive (+) connection to the offboard charging station 30 of FIG. 1. The first approach utilizes a current sensor-triggered pyro fuse and protects against a resistive short (R>0.1 ohm) by opening a contactor based on cell undervoltage diagnostics and mitigation. A copper melt-to-open or short circuit with a pyro fuse (PF) 46A triggered by the short circuit condition are also utilized in the first approach by utilizing shunt S 48. The first approach further differentiates between a high overcurrent fault higher than a specific threshold and low overcurrent fault lower than the specific threshold and other fault conditions and utilizes contactors (contactor rating determined by operating limits of the HV components) to disconnect the HV bus under low over current fault and other fault conditions.

The second approach utilizes a thermal fuse (TF) 56, or solid-state relays (SSRs) or other suitable e-fuses, for protecting certain of the accessory HV components 12, such as APMs and integrated power electronics (IPE0(+)) (or OBCM). There is no disconnect requirement upon a resistive short condition due to medium or low current (fuse rating less than, e.g., about 100 A). The second approach enables HV to the DU to reduce loss of power (LoP) during accessory HV load failure or fault. (Fuse durability for the HV components 12, such as IPE, is usually not a concern).

The third approach utilizes a single pyro fuse PF 46A opened in response to a signal for failure modes from the SDM 50A, thereby enabling fast disconnect of the HV bus 17.

The use of nomenclature "first approach," "second approach" and "third approach" herein is not intended to indicate separation of the disclosed "three approaches" as the disclosed embodiments are implemented via various hardware elements by one or more control elements such that the "three approaches" are coexistent according to a corresponding disconnect requirement. The use of "rear" and "front" nomenclature herein is merely exemplary. The specific location and use in the motor vehicle 20 illustrated in FIG. 1 may vary with the application.

Figure 4:
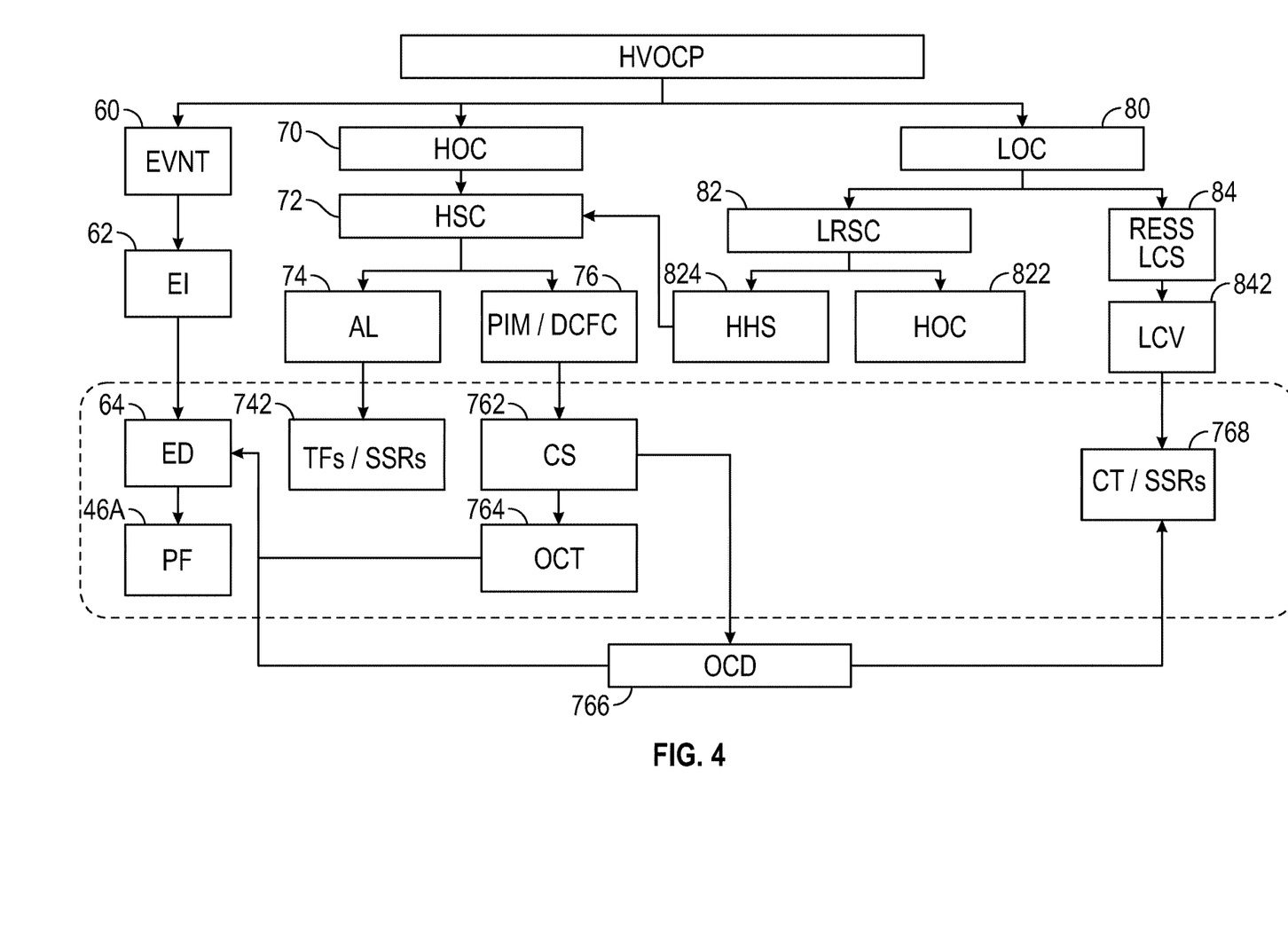
FIG. 4 illustrates a control sequence for fault-based disconnection of a battery pack or HV components according to an embodiment of the present disclosure

FIG. 4 illustrates a control sequence for fault-based disconnection of the battery pack 40 of or HV components 12 of FIG. 2A and FIG. 2B according to an embodiment of the present disclosure. As illustrated in FIG. 4, the present disclosure differentiates between three conditions under which disconnect of the HV bus 17 is required during fault conditions. A first condition is related to an event (EVNT) 60, such as a failure mode or threshold acceleration or deceleration event which requires immediate disconnect of the HV bus 17. A second condition is related to high overcurrent (HOC) 70. A third condition is related to low overcurrent (LOC) 80. The second and third conditions, unlike the first condition, may not require immediate disconnect of the HV bus 17, thereby enabling the response to the second and third conditions to avoid unnecessary loss of power (LoP) incidents.

As illustrated in FIG. 4, determination of the EVNT condition 60 may be based upon an event indicator (EI) 62, such as an airbag module, that provides an indication that the EVNT condition 60 has occurred to an event detector (ED) 64, for instance a comparator circuit or other suitable sensor operable as a squib driver. The PF 46A is utilized to disconnect the HV bus 17.

As further illustrated in FIG. 4, the HOC 70 condition utilizes a hard short circuit (HSC) 72 and a determination of whether the HV bus 17 of FIG. 2A and FIG. 2B is to be disconnected from an accessory load (AL) 74 or a power inverter module (PIM)/DCFC module 76. Thermal fuses (TFs)/SSRs 742 are utilized to disconnect the HV bus from an AL 74. Current sensors (CS) 762 and a corresponding overcurrent threshold (OCT) 764 and overcurrent duration (OCD) 766 are utilized to disconnect the HV bus from a PIM/DCFC module via the ED 64 and OCT 764 or via contactors (CT) or SSRs 768.

Moreover, as illustrated in FIG. 4, the LOC 80 condition utilizes either a low resistance short circuit (LRSC) condition 82 or RESS limit current short (LCS) short condition 84 to disconnect the HV bus 17. The LRSC condition 82 utilizes either heating to open circuit (HOC) 822 to disconnect the HV bus or heating to hard short (HHS) 824 and the corresponding HSC 72 determination process to disconnect the HV bus from an AL 74 or a power inverter module (PIM)/DCFC module 76. Individual HV bus disconnect is performed through the SSRs but not the CT. The RESS LCS condition 84 utilizes lowering cell voltage (LCV) 842 to delay disconnecting the HV bus via CT/SSRs 768 until the LOC condition exceeds a specific overcurrent duration (OCD) 766, such as 10 seconds.

Figure 5:
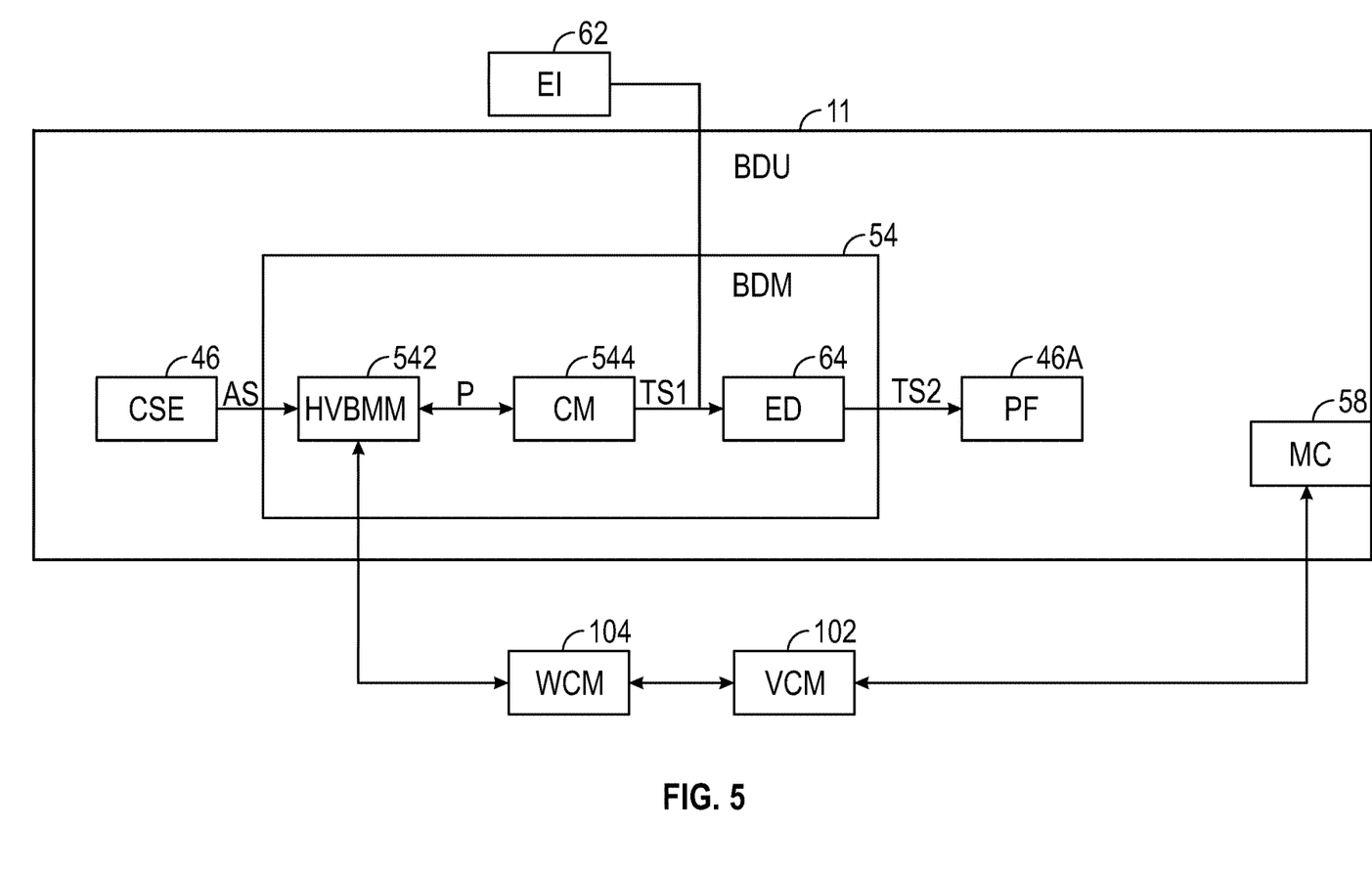
FIG. 5 illustrates a Battery Disconnect Unit (BDU) according to an embodiment of the present disclosure.

FIG. 5 illustrates a Battery Disconnect Unit (BDU) 11 according to an embodiment of the present disclosure. As illustrated in FIG. 5, the BDU 11 includes CSE 46 that provide analog signals (AS) indicative of a sensed current, a battery disconnect module (BDM) 54, the PF 46A and main contactors (MC) 58, i.e., contactors SA2 and SB2 previously disclosed and shown schematically in FIG. 2A and FIG. 2B. The BDM 54 includes a HV battery monitoring module (HVBMM) 542 that monitors the signal (AS) from the CSE 46 and exchanges parameters (P), such as a current and time and diagnostics information, with a control module (CM) 544 of the controller 50, such as a micro-controller. The CM 544 then provides a first trigger signal (TS1) to the event detector (ED) 64, which utilizes the TS1 from the CM 544 and information from the event indicator (EI) 62 to provide a second TS (TS2) or squid driver signal to the PF 46A as disclosed previously. The MCs 58 are controlled by a vehicle control module (VCM) 102, e.g., the VICM 50C of FIG. 3, that communicates with a battery wireless communication module (WCM) 104, where the WCM further communicates with the HVBMM 542 of the BDM 54 of the BDU 11.

The present disclosure enables meeting HV disconnect requirements upon high and low over current fault conditions and other events. The present disclosure achieves solutions that may also reduce mass and packaging space in a cost-efficient manner. The present disclosure further improves quality by replacing pyro fuses, which may have issues of fatigue, nuisance trip, durability, and quality, with thermal fuses and reduces contactor damage concerns. Moreover, the present disclosure improves performance by allowing precise control of HV system disconnect during fault events via electronically controlled high voltage disconnect, which improves customer satisfaction by reducing loss of propulsion incidents.

The detailed disclosure and the drawings are supportive and descriptive of the present disclosure, but the scope of the present disclosure is defined solely by the appended claims. While some of the best modes and other embodiments for carrying out the present disclosure have been disclosed in detail, various alternative designs and embodiments exist for practicing the present disclosure as recited in the appended claims. Moreover, the present disclosure expressly includes combinations and sub-combinations of the elements and features disclosed herein.

Aspects of the present disclosure have been presented in general terms and in detail with reference to the illustrated embodiments. Various modifications can be made by those skilled in the art without departing from the scope and spirit of the disclosed embodiments. One skilled in the relevant art will also recognize that the disclosed methods and supporting hardware implementations may be alternatively embodied in other specific forms without departing from the scope of the present disclosure. Therefore, the present disclosure is intended to be illustrative without limiting the inventive scope defined solely by the appended claims.

What is claimed is:

1. A method for controlling a battery electric system of a motor vehicle, the battery electric system including a direct current (DC) voltage bus having a positive bus rail and a negative bus rail, at least one battery pack connected to the DC voltage bus and having a positive battery terminal and a negative battery terminal, and a battery disconnect unit (BDU), the method comprising:
    disconnecting the at least one battery pack from the DC voltage bus by performing, via the BDU, a first battery disconnect process upon detecting an event condition, the first battery disconnect process utilizing a main pyro fuse;
    disconnecting the at least one battery pack from the DC voltage bus by performing, via the BDU, a second battery disconnect process upon detecting a high overcurrent condition, the second battery disconnect process utilizing one or more of thermal fuses, solid-state relays (SSRs) and current sensors; and
    disconnecting the at least one battery pack from the DC voltage bus by performing, via the BDU, a third battery disconnect process upon detecting a low overcurrent condition, the third battery disconnect process utilizing one or more contactors or one or more SSRs, wherein the low overcurrent condition is related to an accessory load, a power inverter module (PIM), or a DC fast-charging (DCFC) event.

2. The method of claim 1, wherein:
    the first battery disconnect process comprises opening the main pyro fuse to disconnect the at least one battery pack;
    the second battery disconnect process comprises determining a high overcurrent on an accessory load and utilizing at least the one or more thermal fuses, SSRs, or current sensors to disconnect the at least one battery pack, or determining that an overcurrent threshold or overcurrent duration is exceeded and opening the main pyro fuse, or utilizing the one or more contactors or the one or more SSRs to disconnect the at least one battery pack; and
    the third battery disconnect process comprises utilizing the one or more contactors or the one or more SSRs to disconnect the at least one battery pack.

3. The method of claim 2, wherein opening the main pyro fuse comprises utilizing a squib driver.

4. The method of claim 1, wherein detecting the event condition comprises receiving an indication from an airbag module of the motor vehicle.

5. The method of claim 1, wherein detecting the high overcurrent condition comprises determining overcurrent that causes a hard short circuit.

6. The method of claim 1, wherein detecting the low overcurrent condition comprises determining overcurrent indicative of a resistive short circuit or a short condition that causes a low cell voltage of the at least one battery pack.

7. The method of claim 1, wherein the event condition is related to an external event indicative of a threshold deceleration of the motor vehicle.

8. A battery electric system of a motor vehicle, the system comprising:
    a direct current (DC) voltage bus having a positive bus rail and a negative bus rail;
    at least one battery pack connected to the DC voltage bus and having a positive battery terminal and a negative battery terminal; and
    a battery disconnect unit (BDU) comprising:
        a battery monitoring unit configured to detect an event condition and activate a corresponding first battery disconnect process, detect a high overcurrent condition and activate a corresponding second battery disconnect process, and detect a low overcurrent condition and activate a corresponding third battery disconnect process; and a control unit configured to:
   disconnect the at least one battery pack from the DC voltage bus by performing, via the BDU, the first battery disconnect process upon detecting the event condition, the first battery disconnect process utilizing a main pyro fuse;
   disconnect the at least one battery pack from the DC voltage bus by performing, via the BDU, the second battery disconnect process upon detecting the high overcurrent condition, the second battery disconnect process utilizing one or more of thermal fuses, solid-state relays (SSRs) and current sensors; and
   disconnect the at least one battery pack from the DC voltage bus by performing, via the BDU, the third battery disconnect process upon detecting the low overcurrent condition, the third battery disconnect process utilizing one or more contactors or one or more SSRs, wherein the low overcurrent condition is related to an accessory load, a power inverter module (PIM) or a DC fast-charging (DCFC) event.

9. The battery electric system of claim 8, wherein:
the first battery disconnect process comprises opening the main pyro fuse to disconnect the at least one battery pack;
the second battery disconnect process comprises determining a high overcurrent on an accessory load and utilizing at least the one or more thermal fuses, SSRs, or current sensors to disconnect the at least one battery pack, or determining that an overcurrent threshold or overcurrent duration is exceeded and opening the main pyro fuse, or utilizing the one or more contactors or the one or more SSRs to disconnect the at least one battery pack; and
the third battery disconnect process comprises utilizing the one or more contactors or the one or more SSRs to disconnect the at least one battery pack.

10. The battery electric system of claim 9, wherein opening the main pyro fuse comprises utilizing a squib driver.

11. The battery electric system of claim 9, wherein detecting the event condition comprises receiving an indication from an airbag module of the motor vehicle.

12. The battery electric system of claim 8, wherein detecting the high overcurrent condition comprises determining overcurrent that causes a hard short circuit.

13. The battery electric system of claim 8, wherein detecting the low overcurrent condition comprises determining overcurrent indicative of a resistive short circuit or a short condition that causes a low cell voltage in the at least one battery pack.

14. The battery electric system of claim 8, wherein the event condition is related to an external event indicative of a threshold deceleration of the motor vehicle.

15. A motor vehicle comprising:
a vehicle body;
wheels connected to the vehicle body; and
a battery electric system operable for powering the wheels, the battery electric system comprising:
   a direct current (DC) voltage bus having a positive bus rail and a negative bus rail;
   at least one battery pack connected to the DC voltage bus and having a positive battery terminal and a negative battery terminal; and
   a battery disconnect unit (BDU) comprising:
      a battery monitoring unit configured to detect an event condition and activate a corresponding first battery disconnect process, detect a high overcurrent condition and activate a corresponding second battery disconnect process, and detect a low overcurrent condition and activate a corresponding third battery disconnect process; and
      a control unit configured to:
         disconnect the at least one battery pack from the DC voltage bus by performing, via the BDU, the first battery disconnect process upon detecting the event condition, the first battery disconnect process utilizing a main pyro fuse;
         disconnect the at least one battery pack from the DC voltage bus by performing, via the BDU, the second battery disconnect process upon detecting the high overcurrent condition, the second battery disconnect process utilizing one or more of thermal fuses, solid-state relays (SSRs) and current sensors; and
         disconnect the at least one battery pack from the DC voltage bus by performing, via the BDU, the third battery disconnect process upon detecting the low overcurrent condition, the third battery disconnect process utilizing one or more contactors or one or more SSRs, wherein the low overcurrent condition is related to an accessory load, a power inverter module (PIM), or a DC fast-charging (DCFC) event.

16. The motor vehicle of claim 15, wherein:
the first battery disconnect process comprises opening the main pyro fuse to disconnect the at least one battery pack;
the second battery disconnect process comprises determining a high overcurrent on an accessory load and utilizing at least the one or more thermal fuses, SSRs, or current sensors to disconnect the at least one battery pack, or determining that an overcurrent threshold or overcurrent duration is exceeded and opening the main pyro fuse, or utilizing the one or more contactors or the one or more SSRs to disconnect the at least one battery pack; and
the third battery disconnect process comprises utilizing the one or more contactors or the one or more SSRs to disconnect the at least one battery pack.

17. The motor vehicle of claim 15, wherein detecting the high overcurrent condition comprises determining overcurrent that causes a hard short circuit.

18. The motor vehicle of claim 15, wherein detecting the low overcurrent condition comprises determining overcurrent indicative of a resistive short circuit or a short condition that causes a low cell voltage in the at least one battery pack.

19. The motor vehicle of claim 15, wherein detecting the low overcurrent condition comprises determining overcurrent indicative of a resistive short circuit or a short condition that causes a low cell voltage of the at least one battery pack.

20. The motor vehicle of claim 15, wherein the event condition is related to an external event indicative of a threshold deceleration of the motor vehicle.

* * * * *